United States Patent [19]

Morris et al.

[11] 4,250,271

[45] Feb. 10, 1981

[54] ABS-TYPE POLYBLEND COMPOSITIONS

[75] Inventors: Jeff Morris, Big Spring, Tex.; Jacqueline Brandli; Emmanuel Lanza, both of Brussels, Belgium; Willy F. R. Lingier, Beersel, Belgium

[73] Assignee: Cosden Technology, Inc., Big Spring, Tex.

[21] Appl. No.: 39,106

[22] Filed: May 15, 1979

[51] Int. Cl.$^3$ .................................. C08L 51/04
[52] U.S. Cl. ................................. 525/66; 525/69; 525/71; 260/31.8 M; 260/31.8 DR; 260/31.8 AN
[58] Field of Search ................... 525/66, 71, 69; 260/31.8 M, 31.8 DR, 31.8 AN

[56] References Cited

U.S. PATENT DOCUMENTS

| | | | |
|---|---|---|---|
| 3,502,744 | 3/1970 | Weitzel et al. | 525/71 |
| 3,509,237 | 4/1970 | Aubrey | 525/71 |
| 3,903,200 | 9/1975 | Cinera et al. | 525/71 |
| 4,009,227 | 2/1977 | Ott et al. | 525/71 |
| 4,107,234 | 8/1978 | Cornell | 525/71 |
| 4,153,645 | 5/1979 | Lanza | 525/71 |

FOREIGN PATENT DOCUMENTS 51-77159  1/1976  Japan ............................. 525/71

*Primary Examiner*—Hosea E. Taylor
*Assistant Examiner*—Amelia B. Yarbrough
*Attorney, Agent, or Firm*—Schwartz, Jeffery, Schwaab, Mack, Blumenthal & Koch

[57] ABSTRACT

Disclosed is an ABS type polyblend composition exhibiting improved physical properties, which comprises from about 5 to 60% by weight of a copolymer of styrene and acrylonitrile; from about 10 to 70% by weight of a graft copolymer of styrene, acrylonitrile, and a butadiene polymer having an average rubber particle size of from about 1 to 10$\mu$; and from about 10 to 70% of a high butadiene content backbone copolymer of styrene, acrylonitrile, and a butadiene polymer having an average rubber particle size of less than abut 0.5$\mu$, the ratios of the backbone copolymer and the styrene-acrylonitrile-butadiene polymer copolymer being adjusted such that from about 15 to 25% by weight of the total butadiene polymer content of the polyblend is provided by the larger rubber particle size graft copolymer.

23 Claims, No Drawings

ABS-TYPE POLYBLEND COMPOSITIONS

BACKGROUND OF THE INVENTION

The present invention relates to polycomponent polymer blends of the ABS-type, having improved physical properties as compared with known ABS-type polyblend compositions. More particularly, the present invention relates to a polymer tri-blend of the ABS-type having improved elongation properties, flexibility properties, and impact strength, as compared with known ABS-type polymer blends of similar total rubber content.

As used herein, the term "ABS" refers to the monomers acrylonitrile, butadiene, and styrene, of which the instant polyblend compositions are comprised. As also used herein, the term "SAN copolymer" refers to a copolymer comprised of styrene and acrylonitrile monomers.

It is known in the prior art that different polymers may be blended together to provide a polyblend product having the desirable physical properties exhibited by the individual polymer components of the blend. It is also known in the prior art that a polymer composition having a particularly attractive combination of physical properties may be obtained by blending a styrene-acrylonitrile copolymer with one or more rubbery polymers, such as butadiene polymers and copolymers. Typical examples of such prior art polyblend compositions are described in U.S. Pat. Nos. 2,802,808; 4,009,226; and 4,009,227. U.S. Pat. No. 2,802,808 describes a polymer tri-blend comprising a styrene-acrylonitrile copolymer, a styrene-acrylonitrile-butadiene copolymer, and a butadiene polymer. Similarly, U.S. Pat. Nos. 4,009,226 and 4,009,227 describe polymer tri-blends of a styrene-acrylonitrile copolymer, a styrene-acrylonitrile-butadiene copolymer having a larger rubber particle size, and a styrene-acrylonitrile-butadiene copolymer having a smaller rubber particle size. U.S. Pat. No. 4,009,227 adds the additional requirement that the ratio of styrene to acrylonitrile in each of the polymer components of the polyblend of U.S. Pat. No. 4,009,226 must satisfy certain ratios.

While the aforementioned polyblends exhibit satisfactory physical properties in certain respects, the attainment of satisfactory impact strengths, elongation properties, and flexibility properties requires the use therein of an undesirably large amount of the rubbery butadiene polymer or copolymer. Since polybutadiene is a relatively expensive material, the large amounts of this material required in the prior art polyblends in order to achieve satisfactory physical properties results in an undesirably high priced thermoplastic material, the high price of which limits the commercial use of this material. Thus, while it is known in the prior art to blend a styrene-acrylonitrile (SAN) copolymer with a butadiene backbone polymer or copolymer, the prior art polyblends which exhibit satisfactory physical properties have proven relatively expensive, and therefore suitable for use in only a limited number of commercial applications.

There exists a great need in the art, therefore, for an inexpensive thermoplastic composition which exhibits high impact strengths, elongation values, flexibility properties, melt flow properties, and other desirable physical properties.

SUMMARY OF THE INVENTION

It is therefore an object of the instant invention to provide a thermoplastic composition which exhibits improved impact strengths, elongation, and flexibility.

It is an additional object of the instant invention to provide a thermoplastic composition exhibiting improved physical properties which is also relatively inexpensive.

A particular object of the instant invention is the provision of an ABS-type polyblend, which exhibits improved elongation properties, flexibility properties, and impact strengths as compared with prior art ABS-type polyblends of comparable total rubber content.

It is a specific object of the instant invention to provide an ABS-type polyblend which exhibits good impact strength, elongation values, and flexibility properties, while at the same time being relatively inexpensive.

In accomplishing the foregoing, and other objects, there has been provided in accordance with the present invention an ABS-type polyblend composition which exhibits improved elongation, flexibility and impact strength properties as compared with prior art compositions of this type of comparable total rubber content, comprising from about 5 to 60% by weight of a copolymer of styrene and acrylonitrile and from about 95 to 40% by weight of a mixture comprising from about 75 to 30% by weight of a graft copolymer of styrene, acrylonitrile, and a butadiene polymer having an average rubber particle size from about 1 to 10 microns, and from about 25 to 70% by weight of a high butadiene content backbone copolymer of styrene, acrylonitrile, and a butadiene polymer having an average rubber particle size of less than about 0.5 microns, wherein the ratios of the large and small rubber particle size ABS polymer components are adjusted such that from about 5 to 40% by weight of the total butadiene polymer content of the polyblend is provided by the larger rubber particle size ABS-type graft copolymer. The styrene-acrylonitrile copolymers (SAN copolymers) suitable for use in the polyblends of the instant invention comprise by weight from about 15 to 40% acrylonitrile and from about 60 to 85% styrene. Suitable larger rubber particle size ABS graft copolymers comprise those containing by weight from about 96 to 90% of a mixture comprising from about 77 to 90% styrene and from about 23 to 10% acrylonitrile, and from about 4 to 10% by weight of a butadiene polymer having an average rubber particle size of from about 1 to 10 microns. Small rubber particle size ABS graft copolymers suitable for use in the instant polyblends include those copolymers containing by weight from about 80 to 20% of a mixture comprising from about 92 to 34% by weight styrene and from about 8 to 66% by weight acrylonitrile, and from about 20 to 80% by weight of a butadiene polymer having an average particle size of less than about 0.5 microns.

The present invention thus provides an ABS-type polyblend composition having a specific mixture of large and small size rubber particles, and having a carefully controlled composition of certain specific copolymer components. By utilizing the aforementioned specific mixture of large and small size rubber particles, and by controlling both the amount of each copolymer component and the monomer composition of each copolymer component within the aforementioned specified ranges, applicants have found that an ABS-type polyblend is formed which exhibits improved and unexpected properties, specifically, improved flexibility, elongation, and impact strength properties, as compared with prior art ABS-type polyblends containing comparable quantities of butadiene polymer. In effect, the three components of the instant polyblends, when properly blended, coact with one another to produce a polyblend composition which exhibits qualities exhibited to only a limited extent by each of the separate components. Moreover, since the ABS-type polyblends of the instant invention exhibit significantly improved physical properties as compared with prior art polyblends of this type of similar total rubber content, less butadiene polymer is required therein in order to produce a thermoplastic composition having commercially satisfactory physical properties. The present invention thus accrues a further significant advantage in enabling the production of ABS-type polyblends having commercially desirable physical properties at a significantly reduced cost. Accordingly, in view of the highly desirable physical and chemical properties of the instant ABS-type polyblends, and the large commercial demand for economical compositions of this type, the present invention thus provides a much needed contribution to the molding composition art.

The ABS-type polyblend compositions of the instant invention may be produced by any method well known to those skilled in the art. In addition to the aforementioned requirements as to composition and rubber particle size, the only additional requirement for successful practice of the present invention is that the blending of the individual polymer components be conducted to form a homogeneous product polyblend. However, applicants have found that compositions possessing particularly advantageous properties are obtained when the small rubber particle size ABS copolymer component is polymerized according to an emulsion polymerization process, and the larger rubber particle size ABS copolymer component is polymerized by a mass-suspension or mass-polymerization process. Accordingly, in a further embodiment, the present invention also provides a process for the preparation of the instant ABS-type polyblends. This process comprises preparing a styrene-acrylonitrile copolymer comprising by weight from about 15 to 40% acrylonitrile and from about 60 to 85% styrene by free radical polymerization; preparing an ABS graft copolymer comprising by weight from about 96 to 90% of a mixture comprising from about 77 to 90% styrene and from about 23 to 10% acrylonitrile, and from about 4 to 10% of a butadiene polymer having an average rubber particle size of from about 1 to 10 microns, by a mass-suspension or a mass-polymerization process; preparing an ABS copolymer comprising by weight from about 80 to 20% of a mixture comprising from about 92 to 34% styrene and from about 8 to 66% acrylonitrile, and from about 20 to 80% by weight of a butadiene polymer having an average rubber particle size of less than 0.5 microns; and then blending the foregoing copolymers in the above specified proportions with a shear force sufficient to produce a homogeneous blend of said copolymers.

Other objects, features, and advantages of the present invention will become apparent to the skilled artisan upon examination of the following detailed description of the present invention.

DETAILED DESCRIPTION OF THE PREFERRED EMBODIMENTS

As has been described in detail supra, applicants have found that the aforementioned deficiencies of the prior art may be obviated, and ABS-type polyblends having improved physical properties as compared with prior art compositions of this type of similar total butadiene polymer content may be provided through the provision of an ABS-type polyblend having a carefully controlled mixture of large and small rubber particles of specific size therein, and having a carefully controlled composition with respect to both the copolymer components thereof and the monomer constituents of each individual copolymer component. As has been aforementioned, one of the principle objectives of the instant invention is the provision of an ABS-type polyblend which requires reduced amounts of butadiene polymer backbone in order to provide a composition with high quality physical properties. By compounding an ABS-type polyblend meeting the compositional and rubber particle size requirements of the instant invention, an ABS-type polyblend composition is provided which requires significantly less butadiene polymer than prior art polyblends of this type have required in order to produce a composition exhibiting commercially desirable physical properties. In effect, the large and small size rubber particles coact, when present in the instant polyblends in the proportions required by the present invention, with not only themselves, but also with the surrounding styrene-acrylonitrile matrix, to produce an ABS-type polyblend which possesses physical properties greater than the physical properties possessed by each of the individual copolymer components, and which achieves outstanding physical properties, such as for example, impact strength, flexibility, and elongation, with the use of significantly less butadiene polymer therein as compared with prior art compositions of this type of comparable physical properties. Moreover, as a result of this extensive interaction between the components of the instant polyblends, compositions may also be formulated which possess significantly improved impact strength, elongation, and flexibility values as compared to prior art ABS-type polyblends of comparable total butadiene polymer content.

Broadly, the ABS-type polyblends of the instant invention comprise from about 5 to 60% by weight of the SAN copolymer and from about 95 to 40% by weight of a mixture comprising from about 75 to 30% by weight of the large rubber particle size graft copolymer of acrylonitrile, butadiene, and styrene (hereinafter referred to as the large rubber particle size ABS copolymer), and from about 25 to 70% by weight of the high butadiene content small rubber particle size graft copolymer of acrylonitrile, butadiene polymer, and styrene (hereinafter referred to as the small rubber particle or backbone ABS graft copolymer). In a preferred embodiment, the ABS-type polyblends comprise from about 5 to 60% by weight of the SAN copolymer and 95 to 40% by weight of a mixture comprising from about 65 to 40% of the large rubber particle size graft copolymer and from about 35 to 60% of the small rubber particle size graft copolymer. Most preferably, the ABS-type polyblends comprise from about 5 to 45% by weight of the SAN copolymer and from about 95 to 55% by weight of a mixture comprising from about 65 to 45% of the large rubber particle size graft copolymer and from about 35 to 55% of the small rubber particle size graft copolymer. As has been aforementioned, the large size ABS graft copolymer has an average rubber particle size of from about 1 to 10 microns, and the backbone ABS copolymer has an average rubber particle size of less than about 0.5 microns. Particularly advantageous results are obtained, however, when the large rubber particle size ABS graft copolymer has an average rubber particle size of from about 3 to 7 microns, and the backbone ABS graft copolymer has an average rubber particle size of from about 0.08 to 0.4μ. Moreover, as has also been discussed supra, the present invention also requires that the proportions of each of the ABS graft copolymers utilized in the instant polyblends be adjusted such that at least 5% of the rubber phase in the polyblend is provided by the large rubber particle size ABS copolymer. The exact amount of each ABS copolymer utilized in the instant polyblends may be adjusted anywhere within the broad ranges set forth above, provided that the aforementioned mixture of large and small rubber particles is maintained therein. Particularly advantageous results, though, are obtained when the proportion of each ABS copolymer is adjusted such that from about 15 to 25% of the total butadiene polymer content of the blend is contributed by the large rubber particle size ABS copolymer.

The SAN copolymer component of the instant polyblends will generally comprise by weight from about 15 to 40% acrylonitrile, and from about 60 to 85% styrene. Preferably, however, the SAN copolymer will comprise from about 25 to 35% acrylonitrile and from about 65 to 75% styrene, and most preferably, from about 27 to 31% acrylonitrile and from about 69 to 73% styrene. The large rubber particle size ABS graft copolymer will generally comprise by weight from about 96 to 90% of a mixture comprising from about 77 to 90% styrene and from about 23 to 10% acrylonitrile, and from about 4 to 10% by weight of a butadiene polymer having an average rubber particle size of from about 1 to 10 microns. Preferably the large rubber particle size ABS copolymer will comprise by weight from about 95 to 92% of a mixture comprising from about 89 to 81% styrene and from about 11 to 19% acrylonitrile, and from about 5 to 8% by weight of the butadiene polymer; and most preferably from about 94 to 93% by weight of a mixture comprising from about 85 to 81% styrene and from about 15 to 19% acrylonitrile, and from about 6 to 7% by weight of the butadiene polymer. The backbone ABS copolymer will generally comprise by weight from about 80 to 20% of a mixture comprising from about 92 to 34% styrene and from about 8 to 66% acrylonitrile, and from about 20 to 80% of a butadiene polymer having an average rubber particle size of less than 0.5 microns. In the preferred embodiment, the backbone ABS copolymer comprises by weight from about 55 to 25% of a mixture comprising from about 81 to 34% styrene and from about 19 to 66% acrylonitrile, and from about 45 to 75% of the butadiene polymer; and most preferably from about 55 to 45% of a mixture comprising from about 77 to 60% styrene and from about 23 to 40% acrylonitrile, and from about 45 to 55% of the butadiene polymer.

In a further embodiment of the instant invention, a suitable plasticizer may be substituted for a portion of the styrene in the SAN and large rubber particle ABS graft copolymers, typically up to about 7% by weight in the broad formulations of each of these copolymers, up to about 3% by weight in the preferred formulations, and up to about 1% by weight in the most preferred formulations of each of these copolymers. Suitable plasticizers for this purpose are well known to those skilled in the art, and any suitable plasticizer may be utilized in the SAN and large rubber particle ABS graft copolymer components of the present invention. Typical examples of suitable plasticizers include dialkylphthalate, alkylarylphthalates and diarylphthalates such as dioctylphthalate, diphenylphthalate, benzylbutylphthalate, or arylphosphates and alkylphosphate such as triphenylphosphate, mixed cresylphenyl phosphate, 2-ethylhexylphosphate, or still other well known plasticizers such as butylstearate. However, the most preferred plasticizer is dioctylphthalate.

The total butadiene polymer content of the instant polyblends can vary over wide levels. Typically, though, the total butadiene polymer content will comprise from about 10 to 20% by weight, since a rubber content within this range achieves a polyblend composition having the best physical properties at the lowest cost. However, it is to be emphasized that the present invention contemplates the use of butadiene polymer therein in amounts outside this range. For example, when a polyblend composition having very high impact strengths, flexibility, and elongation is desired, and cost is not an overriding concern, polyblend compositions having total rubber contents greater than 20% may be provided in order to maximize physical properties. Similarly, when cost is a limiting factor, and the physical properties of the polyblend are not crucial, amounts of butadiene polymer of less than 10% by weight may be utilized in the instant polyblends.

The butadiene polymer spines of the large rubber particle and the backbone ABS copolymers preferably comprise polybutadiene homopolymer. However, the present invention also contemplates that the butadiene polymer may comprise a copolymer of butadiene with another monomer copolymerizable therewith. Suitable monomers for copolymerization with butadiene include, for example, vinyl compounds such as vinylacetate, vinylformate, vinylpropionate, higher fatty vinyl esters, such as vinylstearate, vinylchloride, vinylfluoride, and the like; vinylaromatics such as styrene, the various mono- and poly-nuclearly chlorinated styrenes, vinylnaphthalene, vinylcarbazole and the like, vinylethers and vinylketones such as methylvinylether, isopropylvinylether, methylisopropenyl ketone, and the like; vinylidene compounds, such as vinylidenechloride, vinylidenechlorobromide, isopropenyl acetate, and the like; acrylic compounds such as acrylonitrile, acrylic acid, methacrylic acid, methylacrylate, methylmethacrylate, ethylmethacrylate, diethylmaleate, malaicanhydride, and the like; and conjugated unsaturated compounds such as isoprene, 2,3-dimethyl-1,3-butadiene, chloroprene, piperylene, 2,3-dichloro-1,3-butadiene and the like. In principal, the butadiene homopolymer or copolymer may also be replaced with other saturated spines, such as, for example, ethylene vinylacetate copolymers or ethylene-propylene-diene terpolymers of 1,5-hexadine, ethylidene norbornene, or dicyclopentadiene. Particularly suitable comonomers for copolymerization with butadiene include styrene and the lower alkylated styrenes, such as, for example, alphamethylstyrene. In the preferred embodiment, though, the butadiene polymer utilized in the polyblend compositions of the instant invention preferably comprises polybutadiene.

The styrene and acrylonitrile monomers utilized in each of the graft copolymer components of the instant invention may be replaced in whole or in part with substituted forms thereof which do not interfere with the polymerization of these copolymers. By way of example, the styrene may be replaced in whole or in part with halogenated styrene, alkylated styrene, or with minor amounts of other compounds such as vinylpyridine and vinylnaphthalene. Specific examples of suitable compounds include alpha-methylstyrene, ethylstyrene, paramethylstyrene, meta-methylstyrene, chlorostyrene, 2,3-dichlorostyrene, fluorostyrene, and bromostyrene. Similarly, the acrylonitrile monomer may be replaced with any of its isomeric and substituted derivatives, such as, for example, the alkylated derivatives thereof and the lower alkyl esters thereof, including methacrylonitrile, methylmethacrylate, ethylmethacrylate, butylmethacrylate, etc.

Minor amounts, for example, up to about 5%, of other polymerizable unsaturated compounds which do not interfere with the production of the desired copolymers, may also be incorporated into the SAN and ABS copolymer components of the instant ABS polyblends. Suitable examples of such compounds include vinyl esters such as vinylchloride, vinylfluoride, vinylacetate; acrylic compounds, such as acrylic and methacrylic acids, esters, amides, and nitriles, such as methylmethacrylate, ethylacrylate, and fumaronitrile; vinylidene compounds, such as, vinylidene chloride and trifluorochloroethylene; cyclic unsaturated compounds, such as the nuclear styrenes, vinyl naphthalene, vinylcarbazole, acenaphthylene; and conjugated unsaturates such as butadiene, isoprene, chloroprene, 2,3-dichlorobutadiene, piperylene, and the like.

SAN and ABS graft copolymers meeting the requirements of the instant invention are well known to those skilled in the art, and any copolymers satisfying the requirements mentioned hereinabove are suitable for use in the instant invention. SAN and ABS graft copolymers highly suitable for use in the instant invention are readily available commercially. Typical examples of commercially available copolymers suitable for use in the present invention include the emulsion polymerized small rubber particle size ABS graft copolymer marketed by the B. F. Goodrich Company under the trade designation ABSON 820×17, comprising about 50% polybutadiene with an average rubber particle size of about 0.3μ, about 16.5% acrylonitrile, and about 33.5% styrene; the mass-suspension polymerized large rubber particle size ABS copolymer marketed by Cosden Technology, Inc., under the trade designation COSDEN 2000, Suspension ABS, comprising about 6.5% of a polybutadiene spine having an average rubber particle size of about 5μ, about 15% by weight acrylonitrile, and about 78.5% styrene; and the SAN copolymer marketed by Cosden Technology, Inc., under the trade designation COSDEN Hi-Flow SAN CX-3876, comprising about 27% by weight acrylonitrile and about 73% by weight styrene. Examples of suitable processes for the preparation of these types of copolymers are described in U.S. Pat. Nos. 2,802,808, 4,009,226, and 4,009,227, the entirety of which is herein incorporated by reference.

Generally, the SAN copolymer resin may be prepared by free radical polymerization by the solution, suspension, bulk, or emulsion polymerization methods. The ABS graft copolymers may be prepared by emulsion polymerization, mass-polymerization (bulk), suspension-polymerization, or mass-suspension polymerization. Whatever process for the production of each of these polymers is selected for actual use, the process conditions utilized therein must be selected such that polymers meeting the requirements of the instant invention are obtained.

In the preferred embodiment, the large rubber particle ABS copolymer will generally be produced by mass-polymerization, and preferably by mass-suspension polymerization, and the small rubber particle backbone ABS graft copolymer will be produced by emulsion polymerization, since copolymers produced by each of these processes result in a polyblend composition having particularly attractive physical properties. Moreover, while any of the aforementioned processes may be utilized for the production of the SAN copolymer, the SAN copolymer will typically be produced by suspension polymerization since in this type of polymerization, recovery of the SAN polymer product from the polymerization mixture is greatly simplified as compared with solution and emulsion polymerization. Additionally, suspension polymerization also produces a SAN copolymer having physical properties making it ideal for use in the polyblend compositions of the instant invention. These types of polymerization processes are well known to those skilled in the art, and any of the processes of the foregoing types known to those skilled in the art as being capable of producing copolymer components having the properties required by the instant invention are suitable for the preparation of the copolymer components of the instant invention.

In the preferred mass- or mass-suspension polymerization of the large rubber particle size ABS graft copolymer, finely ground rubber polymer, preferably polybutadiene, is dissolved in an admixture of styrene and acrylonitrile to produce a solution or admixture of polymerizable material. If desired, additional useful additives may also be dissolved in the admixture of polymerizable materials, such as chain regulating agents, plasticizers, aging retardants, dyes, lubricants, coloring compounds, and other useful additives. Particularly preferred chain regulating agents are the aliphatic or aromatic mercaptans, such as tertiary dodecylmercaptan, lauryl mercaptan, nonyl mercaptan, decyl mercaptan, and other alkyl mercaptans of the general formula R-SH, wherein R is an alkyl radical having from 6 to 18 carbon atoms, and mixtures thereof, or dithiobis (benzothiazole). Suitable anti-oxidants or aging retardants comprise any of the conventional antioxidants such as the phenolic, the alkyl aryl phosphite, or the dialkyl esters of thiodipropionic acid, examples of which include di-tert-butyl-para-cresol and tris-nonyl-phenyl-phosphite. Lubricants which can be incorporated into the solution of polymerizable materials include refined mineral oils, paraffin wax, or mixtures of mineral oils and hydrocarbon oil, or ester lubricants, such as butyl stearate. As has been aforementioned, in one particularly preferred embodiment of the instant invention, a suitable plasticizer, such as dioctylphthalate, may be substituted for a portion of the styrene monomer in the mixture. The remaining optional additives such as the dyes, fillers, and coloring compounds may comprise any conventional material well known to those skilled in the art. In an alternative embodiment of the present invention, the addition of some or all of these agents may be delayed until the compounding or blending step.

After the addition of the chain regulators, and other desirable additives, the polymerization in mass is commenced, with agitation, either thermally or using a free radical polymerization initiator of the oil soluble type, such as the peroxide and azo free-radical polymerization catalysts. Suitable free-radical polymerization catalysts include dibenzoyl peroxide, para-chloro benzoyl peroxide, di-tert-butyl peroxide, cyclohexanone peroxide, t-butyl perbenzoate, t-butyl hydroperoxide, cumene hydroperoxide, dicumyl peroxide, and azobisisobutyronitrile. In the case of thermal initiation, the temperature range of the polymerization will generally lie within the range of from about 90° to 120° C., and in the case of the peroxide initiation, the temperature will generally lie within the range of from about 60° to 120° C. In the mass-type polymerization process, polymerization is then continued until from about 35 to 60% by weight of the reactants in the mixture are polymerized, at which point the polymerization mass is devolatilized to remove unreacted monomer and to recover the large rubber particle size ABS graft copolymer product.

In the mass-suspension type of polymerization process, the admixture of styrene, acrylonitrile, finely ground rubber polymer, preferably polybutadiene, and desirable chain regulating agents, perozide initiators, and other additives is polymerized with agitation until from about 15 to 50% of the monomers are polymerized in the mixture. After prepolymerizing to the desired conversion level, the mixture is then suspended in an aqueous system containing suspension stabilizers. The aqueous suspension is then polymerized for a period of from about 5 to 24 hours at a temperature of from about 60° to 150° C. with continuous agitation until substantially completely polymerized polymer beads are produced. Thereafter, the finished polymer particles are recovered in a pure state by separating them from the aqueous medium by filtration, washing with an acid, such as dilute hydrocholoric acid or warm water, followed by drying in a vacuum oven.

In forming the aqueous suspension of partially polymerized material, any of the usual suspending agents, such as polyvinyl alcohol, hydroxy ethyl cellulose, ammonium polyacrylate, hydroxy apatite, bentonite, polyvinyl pyrolidone, $Al_2O_3$, ZnO, magnesium silicate, the carbonates or phosphates of calcium, barium, stontium, or magnesium, and the like may be used alone or in combination. Optionally, a surface active agent of either the ionic or non-ionic type may also be added to the aqueous suspension. Suitable surface active agents include sodium dodecylbenzene sulfonate, the sulfate esters of aliphatic alcohols ranging from 6 to 14 carbon atoms, such as caproyl sulfate or octyl sulfate, fatty acid surfactants, aromatic carboxylate acid surfactants, aromatic and aliphatic organic sulfates and sulfonates, such as sodium and potassium beta-naphthalene sulfonates, sodium potassium stearates, sodium potassium caproates, sodium and potassium lauryl sulfates, and other common surfactants well known to those skilled in the art.

The butadiene homopolymer or copolymer utilized in the preparation of the large rubber particle size ABS graft copolymer may comprise any of the commercially available soluble polymers. Typical suitable examples of such butadiene homopolymers and copolymers comprise the polybutadiene homopolymer marketed by the Goodyear and Firestone Companies under the trade designations POLYSAR and DIENE, and the butadiene-styrene copolymers marketed by the Firestone and Goodrich Companies under the trade designtions STEREON and AMERIPOL, respectively.

As has been aforementioned, the small rubber particle size ABS graft copolymer will usually and preferably be polymerized by emulsion polymerization. In this type of polymerization, as is well known, a butadiene homopolymer or copolymer latex, styrene, and acrylonitrile, together with any desirable polymer additives, are emulsified in water with the aid of micelle-forming emulsifying agents, typically comprising compounds containing hydrocarbon groups of from about 8 to 22 carbon atoms coupled to highly polar solubilizing groups such as alkali metal and ammonium carboxylate groups, sulfate half-ester groups, sulfonate groups, phosphate partial ester groups, and the like. Exemplary emulsifying agents include sodium oleates, sodium stearate, sodium salts of the sulfate half-esters of fatty alcohols produced by reduction of the fatty acids of natural oils such as coconut oil, sodium abietate, sodium salts of sulfosuccinic esters such as sodium dioctyl sulfosuccinate, sodium salts of alkylated benzene and naphthalene sulfonic acids such as sodium dodecylnaphthalene sulfate, sodium salts of monosulfated fatty monoglycerides, and the like.

The emulsion will also generally contain a suitable water-soluble free-radical polymerization catalyst such as hydrogen peroxide, peroxy and hydroperoxy compounds, potassium or sodium persulfates, perborates, peracetates, percarbonates, and the like, which catalyst may be associated with activating systems, such as redox systems involving versivalent metals and mild reducing agents. Generally, the polymerization medium will also contain a chain transfer agent, such as has been described supra. Polymerization is carried out at temperatures of from about 0° C. to about 80° C. Thereafter, any unreacted monomeric material is preferably stripped off from the latex, and the latex is coagulated to recover the small rubber particle size ABS graft copolymer for blending with the SAN and large rubber particle size ABS graft copolymer constituents of the instant polyblend compositions.

The butadiene polymer spine utilized in the small particle size ABS graft copolymers of the present polyblend compositions is prepared by emulsion polymerization with the rubber particle size being adjusted by varying the ratio of water to monomer, the quantity of activator or emulsifier added, and the quantity of emulsifier utilized, such as is well known to those skilled in the art. In the preparation of the small rubber particle size ABS graft copolymer, the polybutadiene or butadiene copolymer latex resulting from polymerization is not coagulated, but is utilized in latex form.

The SAN copolymer component may be either obtained in commercial form,, or may be polymerized by any of the polymerization processes well known in the art for the preparation of this type of copolymer, as set forth supra. For example, the SAN copolymer may be polymerized in emulsion in a similar manner as in the emulsion polymerization of the small rubber particle size ABS graft copolymer and butadiene spine polymer. Preferably, though, the SAN copolymer is prepared by masssuspension polymerization by forming first a massprepolymer which is further suspension polymerized together with any suitable additives, polymerization catalysts, or chain regulating agents. As has been mentioned above, copolymers of this type are widely available commercially and accordingly copolymers of this type having a composition suitable for use in the instant polyblend compositions are readily attainable.

The three essential copolymer components of the compositions of the instant invention may be blended by any method well known to those skilled in the art, provided only that the blending is conducted to result in a homogeneous polyblend, and that the specified proportions of each copolymer and the specified ratio between large and small rubber particles in the polyblend composition are maintained. Examples of apparatus having a mixing capability sufficient to obtain a homogeneous polyblend composition include roll mills, Banbury mills, single screw extruder, twin screw extruders, internal kneaders, and interfacial surface generators. During the blending operation, suitable fillers, dyes, or other additives such as have been described supra may also be incorporated into the polyblend.

The polyblend compositions of the instant invention may be utilized in a variety of applications, including molding applications, extrusion applications, and other types of applications where high impact strengths and good processability are desired.

In order to more fully describe the present invention, the following examples are presented which are intended merely to be illustrative and not limitative.

EXAMPLE I

A series of polyblend compositions in accordance with the requirements of the instant invention were formulated from commercially available ABS and SAN copolymers by homogeneously blending in a twin screw extruder a small rubber particle size ABS graft copolymer having a rubber particle size of about $0.3\mu$, and comprising about 50% by weight polybutadiene, about 16.5% acrylonitrile, and about 33.5% styrene (ABSON 820×17, B. F. Goodrich Co.); a large rubber particle size ABS graft copolymer having a rubber particle size of about $5\mu$ and comprising about 6.5% by weight polybutadiene, about 15% by weight acrylonitrile, and about 78.5% styrene (COSDEN 2000 Suspension ABS, Cosden Technology, Inc.); and a styrene-acrylonitrile copolymer comprising about 28% by weight acrylonitrile and about 72% by weight styrene (COSDEN HI-FLOW SAN CX-3876, Cosden Technology, Inc.). After preparation, the melt flow, aged impact, elongation properties, and cost for each of these compositions were determined. The composition, physical properties, and cost of each of these polyblend compositions are set forth in the accompanying Table and comprise blend nos. 1, 3, 4, 5, and 8 thereof. By way of comparison, various di-blends of the aforementioned commercially available graft copolymer components were also prepared. The composition, physical properties, and cost of each of these di-blends are set forth in the accompanying Table and comprise blend nos. 2, 6, 7, 9, and 10. By way of further example, the physical properties and cost per pound of the popular ABS-type di-blend marketed by the B. F. Goodrich Company under the trade designation ABSON 89140, comprising from about 35% by weight of the aforementioned small rubber particle size ABS graft copolymer and about 65% of the aforementioned styrene-acrylonitrile copolymer, were determined and are set forth in the accompanying Table as blend no. 11.

As can be readily seen from the accompanying Table, the tri-blend compositions of the instant invention exhibit significantly improved impact strengths, and elongation properties as compared with di-blend compositions of similar total rubber content. Compare, for example, blends 1 and 2; blends 5, 6, and 7; and blends 8–11. A comparison of blend nos. 8 and 11 particularly illustrates the improvement in physical properties obtained through utilization of the tri-blend compositions of the instant invention, as compared with presently commercially available ABS-type di-blends. Moreover, not only do the polyblend compositions of the present invention achieve superior impact strength and elongation as compared with di-blend compositions of equivalent total rubber content, the accompanying Table further illustrates that a significantly lower total rubber content is required by the polyblend compositions of the instant invention in order to achieve satisfactory impact strengths than in the di-blend compositions of the prior art. Compare, for example, tri-blend no. 5, containing approximately 15% total rubber, with di-blend no. 11, containing approximately 20% total rubber. As a result of this lower total rubber requirement by the polyblend compositions of the instant invention, a significant reduction in cost per pound for the polyblend compositions of the instant invention is accrued, as compared with the prior art ABS-type blends. Accordingly, the foregoing exemplary compositions clearly illustrate that the tri-blend compositions of the instant invention achieve not only an unexpected improvement in physical properties, but also a significant reduction in cost.

EXAMPLE 2

A polyblend composition was formulated by homogeneously blending in a twin screw extruder a small rubber particle size ABS graft copolymer having a rubber particle size of about 0.18 microns and comprising about 48% by weight of polybutadiene (Firestone 272 D) and 52% of a mixture of 67% styrene and 33% acrylonitrile; a large rubber particle size ABS graft copolymer having a rubber particles size of about 1.5 microns and comprising about 5.6% by weight of polybutadiene (SOLPRENE 201 made by Petrochim S.A.) and about 94.6% by weight of a mixture of about 90% styrene and about 10% acrylonitrile; and a styrene-acrylonitrile copolymer comprising about 25% by weight acrylonitrile and 73% by weight styrene.

After preparation, the melt flow, aged impact strength, elongation and bend properties of this composition were determined.

By way of comparison, a di-blend composition was prepared.

The compositions, the physical properties of the polyblend and the di-blend are set forth in the following Table II.

While the invention has now been described in terms of certain preferred embodiments, and illustrated by numerous examples, the skilled artisan will readily appreciate that various modifications, changes, substitutions, and omissions may be made without departing from the spirit thereof. Accordingly, it is intended that the scope of the present invention be limited solely by the scope of the following claims.

TABLE I

| % Large Rubber Particle Size on Total Rubber | Blend # | % Small Rubber Particle ABS Copolymer | % Large Rubber Particle ABS Copolymer | SAN Copolymer | (Total) % Rubber | Cond. 1* Gr/10 Min. | Aged Imp. | Elong. | ¢/Lb. |
| --- | --- | --- | --- | --- | --- | --- | --- | --- | --- |
| 20 | 1 | 16% | 31% | 53% | 10% | 7.50 | 2.16 | 48% | 35.6 |
|  | 2 | 20% | — | 80% | 10% | 11.59 | 1.80 | 25% | 36.8 |
| 30 | 3 | 17.5% | 57.7% | 24.8% | 12.5% | 4.70 | 4.84 | 53% | 35.0 |
| 20 | 4 | 20% | 38.5% | 41.5% | 12.5% | 4.69 | 5.20 | 40% | 35.8 |
| 20 | 5 | 24% | 46% | 30% | 15% | 4.22 | 7.04 | 84% | 35.9 |
| 35 | 6 | 19.5% | 80.5% | — | 15% | 2.17 | 5.68 | 89% | 34.3 |
|  | 7 | 30% | — | 70% | 15% | 6.50 | 5.12 | 16% | 37.7 |
| 20 | 8 | 32% | 62% | 6% | 20% | 1.58 | 9.12 | 92% | 36.2 |
| 22.5 | 9 | 31% | 69% | — | 20% | 0.64 | 8.08 | 89% | 34.3 |
|  | 10 | 40% | — | 60% | 20% | 3.56 | 8.30 | 18% | 38.6 |
|  | 11 | 35% | — | 65% | 20% | 2.44 | 6.64 | 10% | 38.2 |

*at 230° C. and 10 kg.

TABLE II

|  | % Small Rubber Particle ABS Copolymer | % Large Rubber Particle ABS Copolymer | SAN Copolymer | % Large Rubber on total Rubber | Total Rubber | Melt Flow* gr/10 min. | Aged Impact | Elongation (%) | Bends |
| --- | --- | --- | --- | --- | --- | --- | --- | --- | --- |
| Polyblend | 36.9 | 19.7 | 43.4 | 5.9 | 18.8 | 1.82 | 5.4 | 42 | 34 |
| Di-blend | 39.2 | — | 60.8 | — | 18.8 | 1.84 | 2.9 | 25 | 19 |

*200° C. - 10 kg.

What is claimed is:

1. An ABS-type polyblend composition, having improved physical properties, comprising:
   (a) from about 5 to 60% by weight of said polyblend of a copolymer A, said copolymer A comprising by weight from about 15 to 40% acrylonitrile, and from about 60 to 85% styrene;
   (b) from about 95 to 40% by weight of a mixture comprising:
      (i) from about 75 to 40% by weight of a graft copolymer B comprising styrene, acrylonitrile and a butadiene polymer, said copolymer B comprising by weight from about 4 to 10% butadiene, having an average particle size of from about 1 to 10 microns;
      (ii) from about 25—60% by weight of a backbone copolymer C comprising styrene, acrylonitrile and a butadiene rubber having an average particle size of less than about 0.5 microns;
   the ratio of copolymer B and backbone copolymer C being adjusted such that from about 5 to 40% by weight of the total butadiene polymer content of said polyblend is provided by said copolymer B.

2. The polyblend composition of claim 1, wherein said polyblend comprises:
   (a) from about 5 to 60% of said copolymer A;
   (b) from about 59 to 40% of a mixture comprising:
      (i) from about 65 to 40% of said copolymer B;
      (ii) from about 35 to 60% of said copolymer C.

3. The polyblend composition of claim 1, wherein said polyblend comprises:
   (a) from about 5 to 45% by of said copolymer A;
   (b) from about 95 to 55% of a mixture comprising:
      (i) from about 65 to 45% of said graft copolymer B;
      (ii) from about 35 to 55% of said graft copolymer C.

4. The polyblend composition of claim 1, wherein graft copolymer B comprises from about 96 to 90% by weight of a mixture comprising:
   (i) from about 77 to 90% of styrene; and
   (ii) from about 23 to 10% of acrylonitrile.

5. The polyblend composition of claim 1, wherein backbone copolymer C comprises:
   (a) from about 20 to 80% by weight of the butadiene polymer;
   (b) from about 80 to 20% by weight of a mixture comprising:
      (i) from about 92 to 34% of styrene; and
      (ii) from about 8 to 66% of acrylonitrile.

6. The polyblend composition of claim 1, wherein said graft copolymer B has an average rubber particle size of from about 3 to 7μ, and said graft copolymer C has an average rubber particle size of from about 0.08 to 0.4μ.

7. The polyblend composition of claim 1, wherein said polyblend has a total rubbery polymer content of from about 10 to 20% by weight.

8. The polyblend composition of claims 1 or 7, wherein said butadiene polymer comprises polybutadiene.

9. The polyblend composition of claim 1, wherein said graft copolymer B is produced by a mass polymerization or a mass-suspension polymerization process.

10. The polyblend composition of claim 1, wherein said backbone copolymer C is produced by an emulsion polymerization process.

11. The polyblend composition of claim 1, wherein said graft copolymers A and B further comprise a plasticizer in an amount up to about 7% by weight of each of said copolymers in substitution for an equivalent amount of styrene in each of said copolymers.

12. The polyblend composition of claim 11, wherein said plasticizer comprises dioctylphthalate.

13. The polyblend composition of claim 1, wherein said copolymer A comprises by weight of said copolymer from about 25 to 35% acrylonitrile, and from about 65 to 75% styrene; said graft copolymer B comprises by weight from about 95 to 92% of a mixture comprising from about 89 to 81% styrene and from about 11 to 19% acrylonitrile, and from about 5 to 8% by weight of a butadiene polymer having an average particle size of from about 1 to 10 microns; and said backbone copolymer C comprises from about 55 to 25% of a mixture comprising from about 81 to 34% styrene and from about 19 to 66% acrylontrile, and from about 45 to 75% of a butadiene polymer having an average particle size of less than about 0.5 microns.

14. The polyblend composition of claim 13, wherein said graft copolymers A and B further comprise up to about 3% by weight of each of said copolymers of a plasticizer in substitution for an equivalent amount of styrene therein.

15. The polyblend composition of claim 14, wherein said plasticizer comprises dioctylphthalate.

16. The polyblend composition of claim 1, wherein said copolymer A comprises by weight from about 27 to 31% acrylonitrile and from about 69 to 73% styrene; said graft copolymer B comprises by weight from about 94 to 93% of a mixture comprising from about 85 to 81% styrene and from about 15 to 19% acrylonitrile; and from about 6 to 7% of a butadiene polymer having an average rubber particle size of from about 1 to 10 microns; and said backbone copolymer C comprises by weight from about 55 to 45% of a mixture comprising from about 77 to 60% styrene and from about 23 to 40% acrylonitrile, and from about 45 to 55% of a butadiene polymer having an average rubber particle size of less than about 0.5 microns.

17. The polyblend composition of claim 16, wherein said graft copolymers A and B further comprise up to about 1% by weight of each of said copolymers of a plasticizer in substitution for an equivalent amount of styrene.

18. The polyblend composition of claim 17, wherein said plasticizer comprises dioctylphthalate.

19. The polyblend composition of claims 1, 11 or 14, wherein the ratios of the amount of copolymer B and backbone copolymer C in said polyblend are adjusted such that from about 15 to 25% by weight of the total butadiene polymer content of said polyblend is provided by said copolymer B.

20. A process for the production of the polyblend of claims 1, 11 or 14, comprising the steps of:
 (a) preparing said graft copolymer A by polymerizing a mixture of styrene and acrylonitrile under free radical polymerization conditions;
 (b) preparing said graft copolymer B by polymerizing a mixture of styrene, acrylonitrile, and said butadiene polymer under mass-polymerization or mass-suspension polymerization conditions;
 (c) preparing said backbone copolymer C by polymerizing a mixture of styrene, acrylonitrile and said butadiene polymer under emulsion conditions; and
 (d) blending said copolymers to produce a homogeneous blend of said copolymers.

21. The process of claim 18, wherein said copolymer A is produced by suspension polymerization, and said graft copolymer C is produced by mass-suspension polymerization.

22. The process of claim 18, wherein said copolymers are homogeneously admixed in a twin-screw extruder.

23. A thermoplastic article manufactured from the polyblend composition of claim 1.

* * * * *